(12) United States Patent
Bien

(10) Patent No.: US 6,579,031 B2
(45) Date of Patent: Jun. 17, 2003

(54) MINIMUM LATERAL PLAY ARCHITECTURE SERVO ARM

(76) Inventor: Jerry Bien, 17177 Gillette Ave., Bldg. A, Irvine, CA (US) 92614

( * ) Notice: Subject to any disclaimer, the term of this patent is extended or adjusted under 35 U.S.C. 154(b) by 0 days.

(21) Appl. No.: 09/849,827

(22) Filed: May 7, 2001

(65) Prior Publication Data

US 2002/0164207 A1 Nov. 7, 2002

(51) Int. Cl.[7] .................................................. F16B 11/00
(52) U.S. Cl. ..................................... 403/359.1; 403/274
(58) Field of Search ................................ 403/292, 298, 403/258, 256, 274, 359.1, 359.6; 74/522, 523, 528, 543, 544, 545, 548, 42, 43

(56) References Cited

U.S. PATENT DOCUMENTS

| | | | | | |
|---|---|---|---|---|---|
| 1,990,990 A | * | 2/1935 | Hathorn | ............... | 403/359.1 X |
| 2,948,558 A | * | 8/1960 | Schultz | ............... | 74/552 X |
| 4,220,054 A | * | 9/1980 | Kuhlman | ............... | 74/545 |
| 4,226,454 A | * | 10/1980 | Tranberg et al. | ............ | 292/336.5 |
| 5,492,024 A | * | 2/1996 | Siner | ............... | 74/89.22 |
| 5,671,904 A | * | 9/1997 | Minutillo | ............... | 251/96 |
| 5,762,439 A | * | 6/1998 | Siner | ............... | 403/359 |
| 6,161,982 A | * | 12/2000 | Cole | ............... | 403/97 |

* cited by examiner

*Primary Examiner*—Robert J. Sandy
(74) *Attorney, Agent, or Firm*—Charles C. H. Wu; Wu & Cheung, LLP

(57) ABSTRACT

A servo-member comprises: a rigid body having first and second opposed planar surfaces; a moderate protruding member formed on the first surface; a first bore through the moderate protruding member, said first bore having a first diameter including a splined portion terminating adjacent an annular seat; a hub in the second surface, said hub forming a second bore, the second bore separated from the first bore by said annular seat, said annular seat having an opening formed to connect the first bore with said second bore.

11 Claims, 2 Drawing Sheets

MINIMUM LATERAL PLAY ARCHITECTURE SERVO ARM

BACKGROUND OF THE INVENTION

1. Field of the Invention

This invention relates generally to a servo-arm for transferring control motion from a servo-motor to control members.

2. Description of Related Art

A servo-motor generally has a servo-motor spline protruding from the servo. When the motor is activated, the servo-motor spline can turn in either a clockwise or a counterclockwise direction. A servo-motor requires a servo arm or wheel to transfer control motion from the servo-motor to control members. In the past, servo-arms were formed of plastic materials. These arms were coupled to either cables or metal control rods and also to servo-output shafts.

The arm is subjected to high stress in reversed directions. This wears on the arm leading to ever-increased likelihood of failure. The wear also increases the lateral play in the arm-servomotor connection. A small amount of lateral play allows the arm to move loosely, which creates leads to more lateral play.

One attempt to overcome the limitations of the plastic servo-wheel was to provide a wheel in the form of a rigid metal disc. The traditional configuration was to have a hub at the center of the disc having a through bore broached for keyed connection to the servo-motor spline. Further improvements of the traditional design included more efficient methods to manufacture the servo-wheel. One such improvement in manufacture is shown in Siner 5,762,439.

Unfortunately, the traditional design does not ameliorate problems with lateral play. The foregoing illustrates limitations of the known prior art.

SUMMARY OF THE INVENTION

A servo-member comprises a rigid body having first and second opposed planar surfaces; a moderate protruding member formed on the first surface; a first bore through the moderate protruding member, said first bore having a first diameter including a splined portion terminating adjacent an annular seat; a hub in the second surface, said hub forming a second bore, the second bore separated from the first bore by said annular seat, said annular seat having an opening formed to connect the first bore with said second bore.

DESCRIPTION OF THE PREFERRED EMBODIMENT

Figure 1:
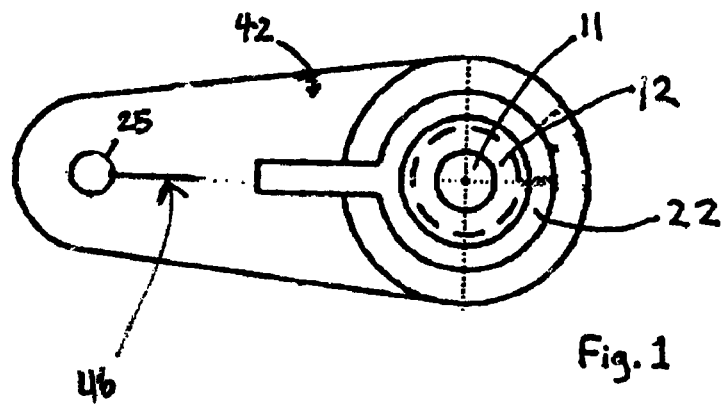
FIG. 1 is a top view of the minimal lateral play servo-arm showing the hub of the servo-arm.
Figure 2:
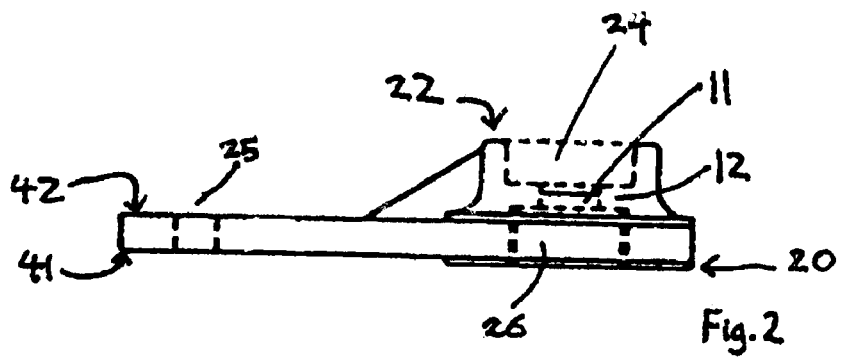
FIG. 2 is a side view of the minimum lateral play servo-arm.
Figure 3:
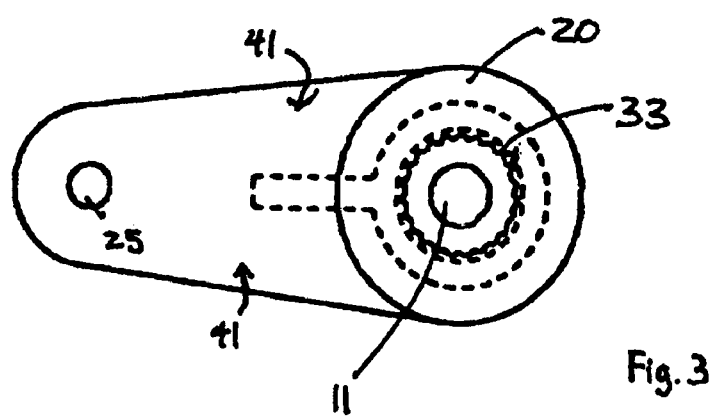
FIG. 3 is a bottom view of the minimum lateral play servo-arm showing the bore that receives the servomotor spline.

The minimal lateral play servo arm minimizes lateral play. The improved servo arm has two surfaces. The first surface 41, FIG. 2 and FIG. 3 is the surface facing the servomotor. The second surface 42 FIG. 1 and FIG. 2 is the surface facing away from the servomotor. In a traditional servo connection, a hub connects the servo arm to the servomotor spline. Instead of having the traditional hub at the first surface 41, the Minimum lateral play servo arm has a moderate protruding member 20 at the first surface 41, FIG. 2 and FIG. 3. A first bore 26 is formed through the moderate protruding member 20. The first bore 26 has a first diameter including a splined portion 33 terminating adjacent an annular seat 12.

The minimum lateral play servo arm can also employ a hub 22, FIG. 1 and FIG. 2 at the second surface 42, FIG. 1 and FIG. 2. The hub 22 forms a second bore 24 capable of receiving a machine screw. A hub 22, FIG. 1 and FIG. 2 would retain the machine screw and protect it from contact against other nearby moving parts. The second bore 24 is separated from the first bore 26 by an annular seat 12, said annular seat 12 has an opening 11 formed to connect the first bore 26 with said second bore 24. The opening 11 allows a machine screw to pass through the annular seat 12 when a user applies said machine screw to retain the Minimum lateral play servo arm against a servo motor shaft 48. A servo motor shaft 48 generally has a threaded opening 52 through the axis of rotation. The threaded opening 52 is generally capable of receiving a machine screw.

The height of the moderate protruding member 20, FIG. 2 and FIG. 3 should preferably be approximately one millimeter or less.

Figure 4:
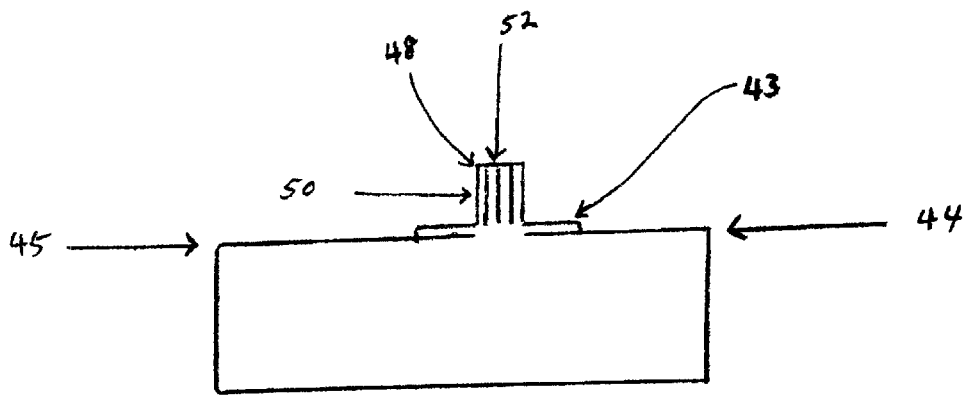
FIG. 4 is a side view of the minimum lateral play servo-arm showing the housing of the servo motor.

Many servo motors are built with a round flat surface 43 around the servo motor shaft 48. The round flat surface 43, FIG. 4, protrudes from a ground zero 44 level that is defined as the plane coinciding with the top of the housing of the servomotor 45, FIG. 4.

Figure 5:
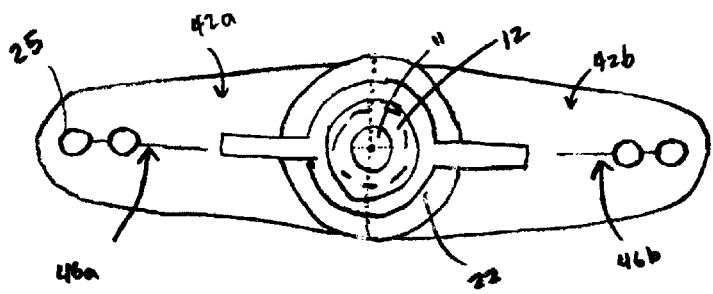
FIG. 5 is a top view of an alternative embodiment of the invention.
Figure 6:
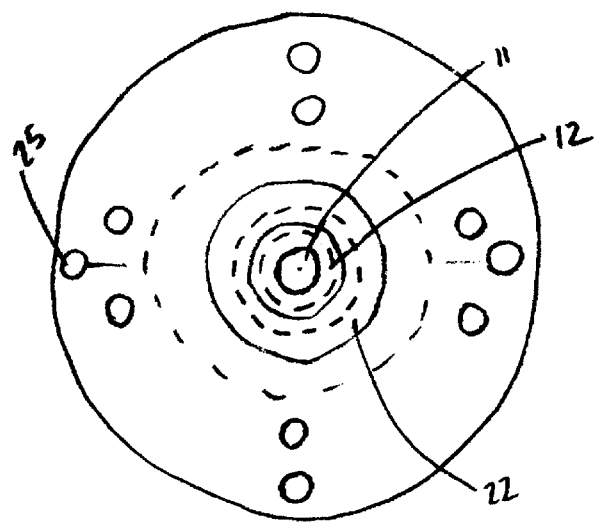
FIG. 6 is a top view of a second alternative embodiment of the invention.

The moderate protruding member 20 serves as bushing between first surface 41 and the round flat surface 43 of the servo motor housing. Further, it serves as a secondary mechanism to restrict excessive lateral movement in a servo motor shaft 48 in a case of a poorly performing or an aged servo motor. The servo motor shaft 48 protrudes from this round flat surface 43. This low profile design minimizes the lateral play of the servo arm by bringing the servo arm pivoting points closer to ground zero 44. One or more connection points 25 can be implemented as drilled holes to allow connection of a control rod to the servo-arm. A score line 46 can emanate from the connection point 25 preferably implemented as drilled hole. A score line 46 or score pivot points drawn on the surface of the arm where users would usually drill holes would be helpful to guide a user to drill holes in precise locations connection at a lower height compared to the servomotor spline allows more efficient transmission of rotational a control movement. This lowers the plane of rotation. The first bore 26 can be keyed with spline 33 to engage with the servo motor spline 50. The Minimum lateral play servo arm's splined portion 33 is close to ground zero 44. Thus, there is less play than the traditional configuration due to the position of the servo motor spline 50. Various arm and wheel configurations are well known. The body is usually formed with an arm extending radially outwardly from the hub 22, FIG. 1 and FIG. 2. For certain configurations the body includes a pair of diametrically opposed arms extending radially outwardly from the hub 22, FIG. 5. The body can also be disc-shaped where the hub is in the geometric center of the disc, FIG. 6. Control rods can be mounted on the ends of the arms or on the wheel.

Although many materials and processes are available, milled aluminum preferably forms the servo-member body.

A mill with a cutting end shapes, finishes, and forms various configurations upon the servo member. The various machine operations form the entire servo member.

The minimal lateral play architecture servo arm can be keyed with rectangular spline 33 or triangular spline 33. The servo motor shaft 48 can have rectangular spline 50 or triangular spline 50.

What is claimed is:

1. A servo-member comprising:
   a rigid body having first and second opposed planar surfaces;
   a moderate protruding member formed on the first surface;
   a ground zero level distal-proximate to the first surface, the ground zero level coplanar with a splined side of a servo motor housing;
   a first bore through the moderate protruding member, the first bore having a first diameter including a spline portion terminating adjacent an annular seat; and
   a hub in the second surface, the hub forming a second bore, the second bore separated from the first bore by the annular seat, the annular seat having an opening formed to connect the first bore with the second bore; wherein the moderate protruding member is formed of a height to allow the servo-member to be as close as possible to the ground zero reference level.

2. The servo-member of claim 1, wherein the first bore is keyed with spline.

3. The servo-member of claim 1, wherein the rigid body includes an arm extending radially outwardly from the hub.

4. The servo-member of claim 1, wherein the rigid body includes a pair of diametrically opposed arms extending radially outwardly from the hub.

5. The servo-member defined in claim 1, wherein the rigid body is disc-shaped and the hub is in the geometric center of the rigid body.

6. The servo-member as defined in claim 1, wherein a milling process forms the body.

7. The servo-member as defined in claim 1, wherein the body is formed of aluminum.

8. The servo-member as defined in claim 1, wherein the moderate protruding member is substantially circular.

9. The servo-member as defined in claim 1, wherein the rigid body includes an arm extending radially outwardly from the hub, and wherein one or more connection points are formed on the servo arm.

10. The servo-member as defined in claim 1, wherein a score line or score pivot points are drawn upon the second surface of the servo member.

11. A servo-member comprising:
    a rigid body having first and second opposed planar surfaces;
    a ground zero level distal-proximate to the first surface, the ground zero level coplanar with a splined side of a servo motor housing;
    a first bore through the first surface, the first bore having a first diameter including a splined portion terminating adjacent an annular seat; and
    a hub in the second surface, the hub forming a second bore, the second bore separated from the first bore by the annular seat, the annular seat having an opening formed to connect the first bore with the second bore; wherein the servo-member is positioned as close as possible to the ground zero level.

\* \* \* \* \*